US009165437B2

(12) United States Patent
Reimann et al.

(10) Patent No.: US 9,165,437 B2
(45) Date of Patent: Oct. 20, 2015

(54) METHOD FOR RECOGNIZING ATTEMPTS AT MANIPULATING A SELF-SERVICE TERMINAL, AND DATA PROCESSING UNIT THEREFOR

(75) Inventors: Christian Reimann, Salzkotten (DE); Holger Santelmann, Paderborn (DE)

(73) Assignee: Wincor Nixdorf International GmbH (DE)

( * ) Notice: Subject to any disclaimer, the term of this patent is extended or adjusted under 35 U.S.C. 154(b) by 469 days.

(21) Appl. No.: 13/264,135

(22) PCT Filed: Apr. 16, 2010

(86) PCT No.: PCT/EP2010/055016
§ 371 (c)(1),
(2), (4) Date: Oct. 12, 2011

(87) PCT Pub. No.: WO2010/121959
PCT Pub. Date: Oct. 28, 2010

(65) Prior Publication Data

US 2012/0038774 A1 Feb. 16, 2012

(30) Foreign Application Priority Data

Apr. 22, 2009 (DE) ......................... 10 2009 018 320

(51) Int. Cl.
*H04N 7/18* (2006.01)
*G07F 19/00* (2006.01)

(52) U.S. Cl.
CPC .............. *G07F 19/207* (2013.01); *G07F 19/20* (2013.01)

(58) Field of Classification Search
CPC ........................................................ H04N 7/18
See application file for complete search history.

(56) References Cited

U.S. PATENT DOCUMENTS

2003/0072476 A1* 4/2003 Kim et al. ..................... 382/128
2004/0264760 A1* 12/2004 Ishikawa ....................... 382/145
(Continued)

FOREIGN PATENT DOCUMENTS

CN 101059891 A 10/2007
DE 20102477 U1 5/2001
(Continued)

OTHER PUBLICATIONS

International Preliminary Report on Patentability (Chapter I of the Patent Cooperation Treaty) in German (with English translation) for PCT/EP2010/055016, issued Oct. 25, 2011.
(Continued)

*Primary Examiner* — Dave Czekaj
*Assistant Examiner* — Kehinde O Abimbola
(74) *Attorney, Agent, or Firm* — Harness, Dickey & Pierce, P.L.C.

(57) ABSTRACT

A method (100) is proposed for recognizing attempts at manipulating a self-service terminal, specifically a cash dispenser, in which a control panel with elements arranged therein, such as a keypad, cash-dispensing slot, etc. is provided, wherein a camera is directed onto at least one of the elements and wherein the image data generated by the camera are evaluated. Using edge detection, at least one edge image is created from the image data generated (step sequence 120). The edge image is evaluated using a reference edge image (step sequence 130). To generate the reference edge image, several individual images are used (step sequence 110). Fully automated evaluation and recognition of manipulation attempts is possible using edge detection.

39 Claims, 6 Drawing Sheets

(56) References Cited

U.S. PATENT DOCUMENTS

| | | | | |
|---|---|---|---|---|
| 2005/0073584 | A1* | 4/2005 | Enright et al. | 348/150 |
| 2005/0272501 | A1* | 12/2005 | Tran et al. | 463/29 |
| 2006/0114322 | A1* | 6/2006 | Romanowich et al. | 348/143 |
| 2006/0218057 | A1* | 9/2006 | Fitzpatrick et al. | 705/28 |
| 2007/0015583 | A1* | 1/2007 | Tran | 463/40 |
| 2008/0278579 | A1* | 11/2008 | Donovan et al. | 348/143 |
| 2008/0316315 | A1* | 12/2008 | Donovan et al. | 348/152 |
| 2009/0057395 | A1* | 3/2009 | He et al. | 235/379 |
| 2009/0201372 | A1* | 8/2009 | O'Doherty et al. | 348/150 |
| 2010/0214413 | A1* | 8/2010 | Lin et al. | 348/150 |

FOREIGN PATENT DOCUMENTS

| | | | |
|---|---|---|---|
| DE | 20318489 | U1 | 2/2004 |
| GB | 2351585 | A | 1/2001 |
| WO | WO-2005109315 | A2 | 11/2005 |
| WO | WO-2007093977 | A1 | 8/2007 |

OTHER PUBLICATIONS

International Search Report (in German with English Translation) for PCT/EP2010/055016, mailed Sep. 23, 2010; ISA/EP.

Notification of Third Chinese Office Action for Application No. 2010-80017761.8 dated May 13, 2014 (9 pages).

First Chinese Office Action for Application No. 2010-80017761.8 dated Jun. 4, 2013 (13 pages).

Second Chinese Office Action for Application No. 2010-80017761.8 dated Jan. 13, 2014 (9 pages).

* cited by examiner

METHOD FOR RECOGNIZING ATTEMPTS AT MANIPULATING A SELF-SERVICE TERMINAL, AND DATA PROCESSING UNIT THEREFOR

CROSS-REFERENCE TO RELATED APPLICATIONS

This application is a U.S. National Stage of International Application No. PCT/EP2010/055016, filed Apr. 16, 2010 and published in German as WO 2010/121959 A1 on Oct. 28, 2010. This application claims the benefit and priority of German Application No. 10 2009 018 320.5, filed Apr. 22, 2009. The entire disclosures of the above applications are incorporated herein by reference.

BACKGROUND

This section provides background information related to the present disclosure which is not necessarily prior art.

TECHNICAL FIELD

The invention relates to a method for recognizing attempts at manipulating a self-service terminal in accordance with the preamble of claim 1. The invention additionally relates to a device operating in accordance with the method, in particular a data processing unit for processing image data and a self-service terminal furnished therewith, in particular a self-service terminal designed as a cash dispenser.

Discussion

In the area of self-service automats, in particular automated teller machines, criminal activities in the form of manipulation are frequently undertaken with the goal of spying out sensitive data, in particular PINs (personal identification numbers) and/or card numbers of users of the self-service terminal. Specifically, attempts at manipulation are known in which skimming devices, such as keypad overlays and similar, are installed illegally in the operating area or on the control pad. Such keypad overlays frequently have their own power supply, as well as a processor, a memory and an operating program so that an unsuspecting user is spied on when entering his PIN or when inserting his bank card. The data mined in this way are sent by a transmitter integrated into the keypad overlay to a remote receiver or are stored in a data memory integrated into the keypad overlay. Many of the skimming devices encountered today can be distinguished only with great difficulty by the human eye from the original controls (keypad, card reader, etc.).

In order to frustrate such attempts at manipulation, monitoring systems are often used having one or more cameras that are mounted close to the site of the self-service terminal and that capture images of the entire control panel and frequently also where the user is standing as well. One such solution is described in DE 201 02 477 U1, for example. By means of camera monitoring, images of both the control panel itself and the area in front of said panel occupied by the user can be captured. Another sensor is provided in order to distinguish whether there is a person in said area.

Accordingly, devices and methods are basically known for detecting attempted manipulation at a self-service terminal wherein a camera is directed towards at least one of the elements provided on the control panel, such as the keypad, cash dispensing slot and wherein the image data generated by the camera are evaluated. In order to use methods that enable fully automated image evaluation, the complexity of the hardware and software is greater, and the associated costs must be overcome.

SUMMARY OF THE INVENTION

An object of the present invention is, therefore, to propose a solution for a reliable and cost-effective implementation of camera monitoring with recognition of attempts at manipulation.

Accordingly, it is proposed that at least one edge image is created from the image data generated by the camera by means of edge detection and that the edge image is evaluated using a reference edge image.

The use of edge detection in accordance with the method proposed here not only reduces the amount of data considerably but also increases the speed and reliability of image evaluation.

Preferably edge image data that represent the edge image are logically linked with reference edge image data that represent the reference image to form initial results image data that represent an initial results image, in particular through an XOR operation. The effect of this data operation is that, in this results image so assembled, all edges that coincide with the reference edge image are hidden so that essentially only the edges, or the outlined elements, or parts that could be manipulated can still be seen.

Then the initial results image data are preferably linked logically to the reference edge image data to form second results image data that represent a second results image, in particular using an AND operation. As a result of this operation, the areas not to be monitored are hidden so that only those edges, or parts of said edges, can be seen that belong to foreign objects that have been inserted into the area to be monitored. This refers in particular to keypad overlays, spy cameras and similar manipulations.

Because of the edge detection proposed here, analysis of the edge images can be implemented very efficiently and quickly using simple computer hardware and software when the white content is determined in the second results image, and when, in order to recognize a manipulation attempt, a check is made whether the white content exceeds a specifiable threshold value.

Accordingly it is advantageous when calculating the at least one edge image if the particular edge image is calculated from several individual images, wherein an average image is calculated specifically by creating average values from the respective image data. These steps are performed in order to have image data with as little noise as possible for the actual evaluation.

The applicant has recognized that it is particularly advantageous if the reference edge image is calculated from several individual reference images. An average image is likewise calculated by creating average values from the respective image data. In this context, when creating the average values, the average color value for each pixel is determined. Then the respective average image is converted into a gray-scale image.

For the actual edge detection, it is preferable to perform Sobel filtering of the image data, wherein the particular gray-scale image is specifically subjected to Sobel filtering in order to create the edge image or the reference edge image, respectively. A combined Sobel filter in a normalized form (e.g. 3×3 horizontal and 3×3 vertical) can be used.

It is also of advantage if edge detection is performed by means of segmentation filtering of image data, wherein the particular gray-scale image subjected specifically to Sobel filtering is then subjected to segmentation filtering in order to create the edge image or the reference edge image, respectively. The edge image is broken down into its black and white content by means of a threshold value so that a mask of the edges results.

To the extent that it concerns the reference edge image, or its mask, it is advantageous if a second manual image revision is performed, wherein particularly the respective gray-scale image that underwent segmentation filtering undergoes manual image revision in which elements not important to the evaluation are removed, for example, areas or edges that are not to be monitored, or artifacts that arose as the result of image noise. Thus, only the essential edges remain in the reference, in particular the outlines of the elements to be monitored. This also has the advantage that during the aforementioned AND operation the unimportant areas no longer appear in the results image.

It is also advantageous if different reference edge images are created as a function of prevailing and/or emerging conditions, in particular of lighting or daylight conditions. In this way, different references are available for the evaluation of the edge images that have been optimized in each case for a typical situation.

A data processing unit for performing the method is also proposed that can be a PC, and a self-service terminal equipped therewith.

As a result of the invention, the recognition in particular of overlays on individual or several elements can be clearly improved and fully automated. Preferably the camera captures images of elements especially suitable for manipulation and/or elements in areas of the control panel especially suitable for manipulation, such as the cash-dispensing slot, keypad, card slot and/or monitor. The elements are preferably controls in the stricter sense, but can also be other elements, such as the installation panel close to the control panel, or a logo, information notice, lettering and similar. The camera has an acquisition angle that preferably captures images of several operating elements, such as the cash-dispensing slot and the keypad. The camera preferably has a wide-angle lens with an acquisition angle of at least 130 degrees.

It may be advantageous if the camera is installed in that section of the housing of the self-service terminal which bounds the control panel to the side or to the top. This may be specifically the surround of the control panel.

The data processing unit connected to the at least one camera can be integrated completely into the self-service terminal. In conjunction with the image processing proposed here, provision can be made for the data processing unit to have a first stage receiving the image data for processing, in particular for shadow removal, edge detection, vectorizing and/or segmenting. The data processing unit in particular can have a second stage downstream from the first stage for feature extraction wherein specifically blob analysis, edge position and/or color distribution are carried out. In addition, a third stage downstream from the second stage can be provided for classification.

Provision can also be made for the data processing unit, if it recognizes a manipulation attempt at the captured elements by processing the image data, to trigger an alarm, to shut down the self-service terminal and/or trigger an additional camera (portrait camera).

The camera and/or the data processing unit are preferably deactivated during operation and/or maintenance of the self-service terminal.

BRIEF DESCRIPTION OF THE DRAWINGS

The invention and the advantages resulting therefrom are described hereinafter using embodiments and with reference to the accompanying schematic drawings. The drawings described herein are for illustrative purposes only of selected embodiments and not all possible implementations, and are not intended to limit the scope of the present disclosure.

Figure 2:
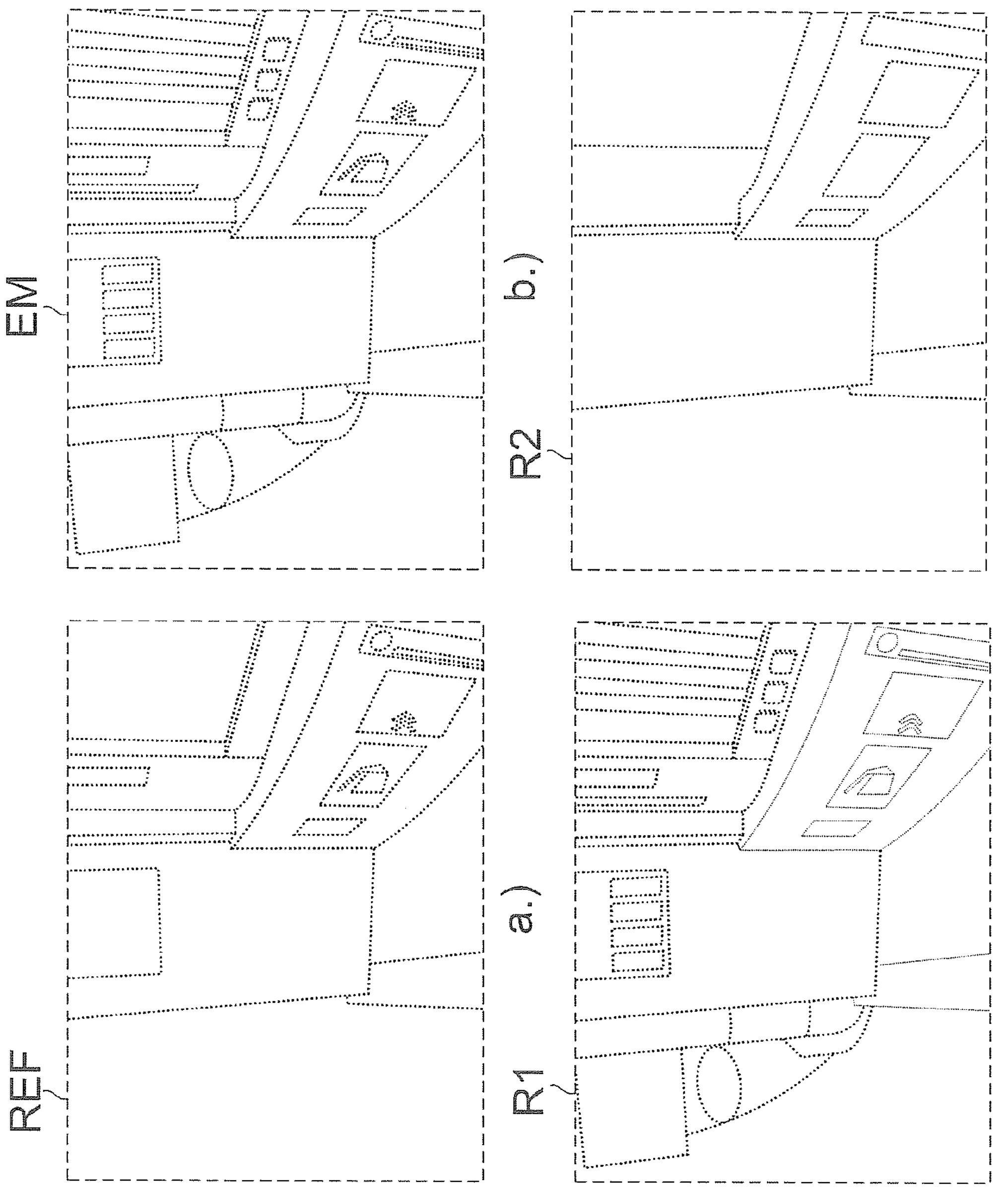
FIG. 2 *a*)-*d*) show examples of edge images and results images generated.
Figure 3:
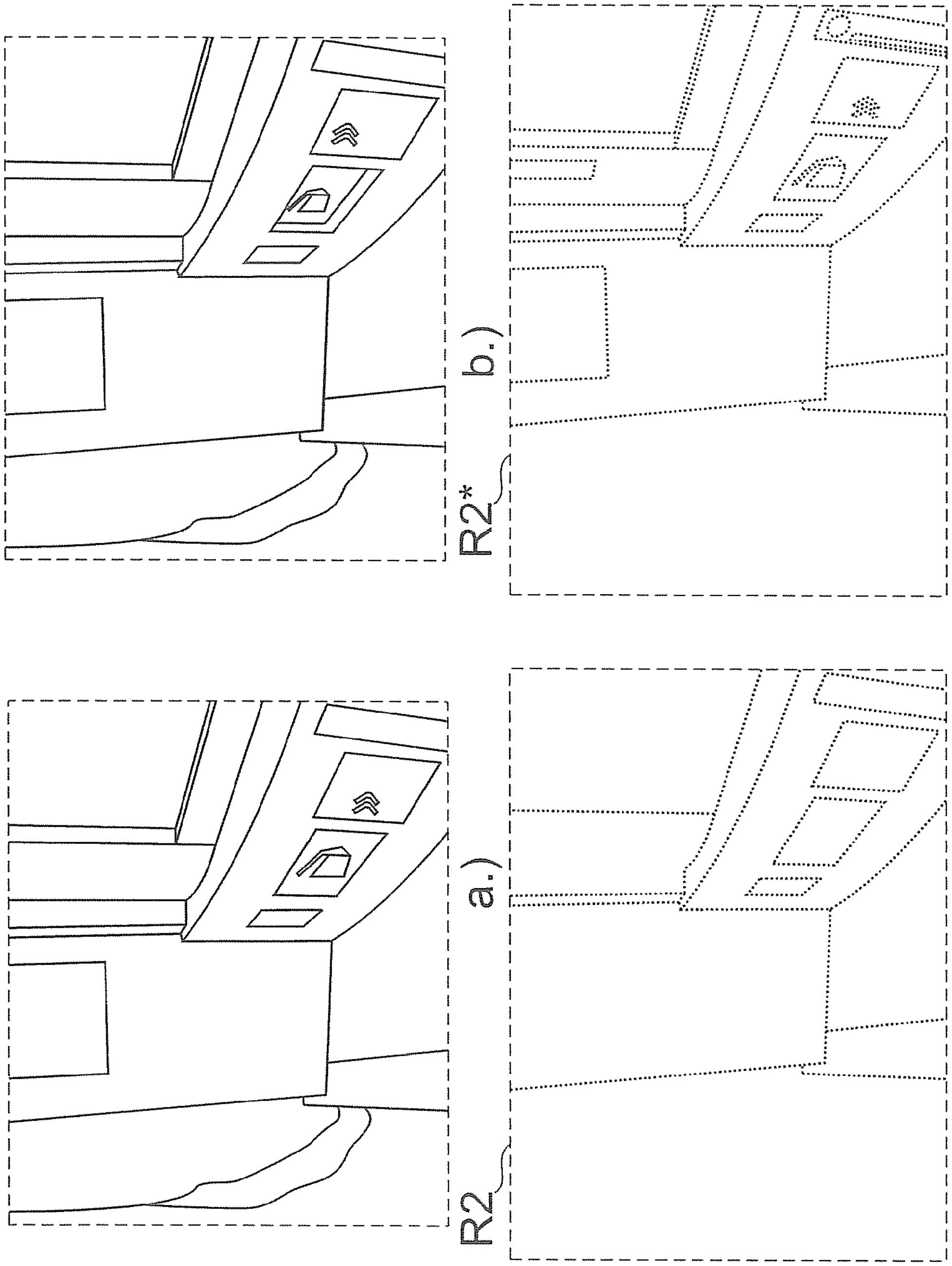
FIG. 3 *a*)-*d*) show examples of original recorded camera images and edge or results images.

The edge images shown in FIGS. 2 and 3 should actually show white edges running on a black background. In order to satisfy the requirements for patent drawings, the representations are shown inverted here, i.e. black edges are shown running on a white background.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
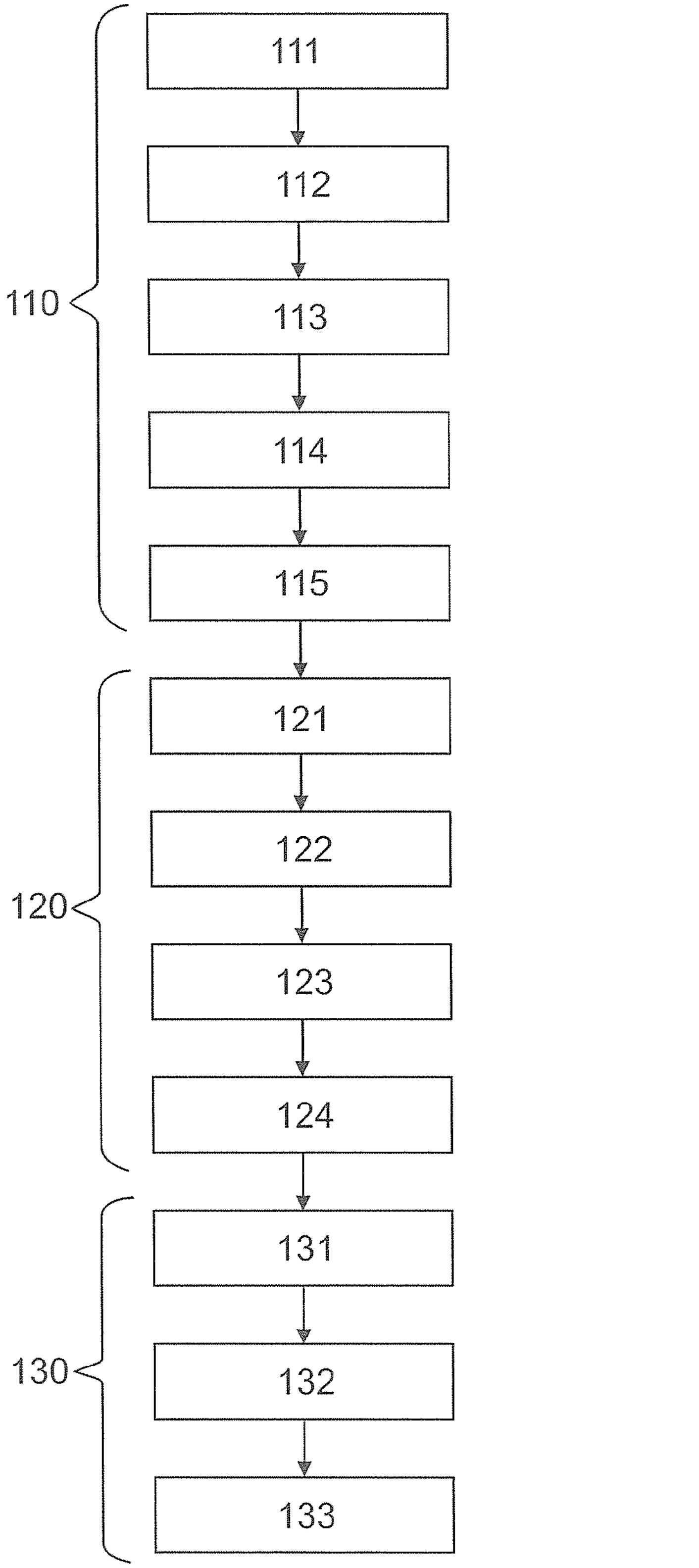
FIG. 1 shows a flow chart of the method in accordance with the invention.

FIG. 1 shows a schematic representation of a flow chart for the method 100 in accordance with the invention that can be subdivided into the following sequence of steps 110 to 130:

In the sequence of steps 110 with the individual steps 111 to 115, at least one reference edge image is generated from the camera image data. The assumption is a self-service terminal in a non-manipulated state.

In the sequence of steps 120 with the individual steps 121 to 124, at least one edge image is generated from the camera image data. The self-service terminal is in use so that a manipulation attempt that is supposed to be recognized by the method described here could have been made.

In the sequence of steps 130 with the individual steps 131 to 133, the at least one edge image is evaluated with the assistance of the at least one reference edge image.

The individual steps of the method 100 are described hereinafter with reference to the additional Figures:

FIGS. 2*a*)-*d*) and FIGS. 3*a*)-*d*) show examples of the images generated in the method and processed further. Before additional details are discussed, reference is made to FIGS. 4 to 7 which show the self-service terminal proposed here, camera perspectives of said terminal and the data processing carrying out the method.

Figure 4:
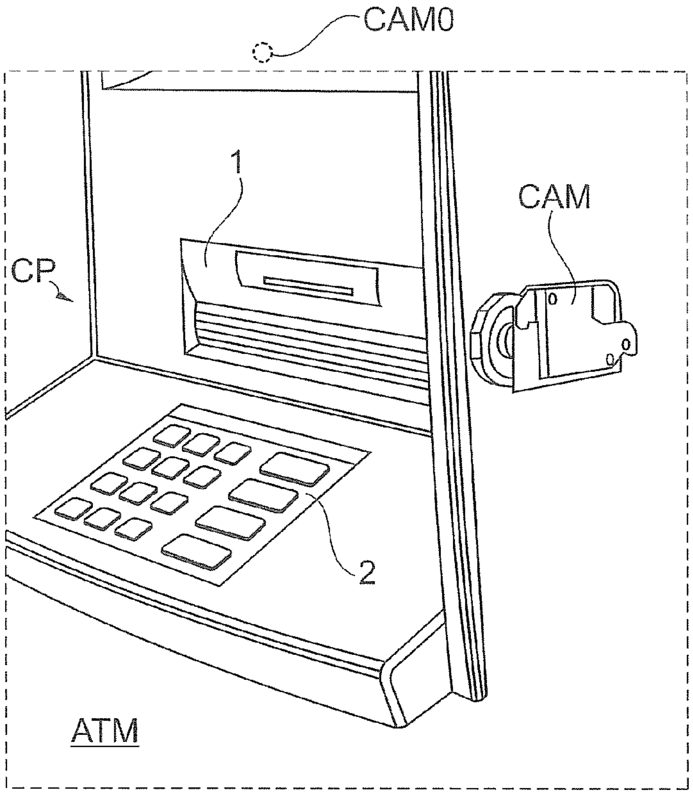
FIG. 4 shows a perspective view of the control panel of a self-service terminal with a camera integrated at the side.

FIG. 4 shows in a perspective view the principle structure of a self-service terminal in the form of automated teller machine ATM having a control panel CP and equipped with a camera CAM in accordance with the invention for recognizing manipulation attempts. The camera CAM is located in a side section of the housing that frames, or surrounds, the control panel of the automated teller machine ATM. The control panel includes in particular a cash-dispensing slot 1, also called a shutter, and a keypad 2. These are controls against which manipulation attempts, for example in the form of overlays for the purpose of skimming, may be made. The coverage area, or angle, of the camera CAM includes at least these two elements 1 and 2 and makes reliable recognition of such manipulation attempts possible.

Figure 5:
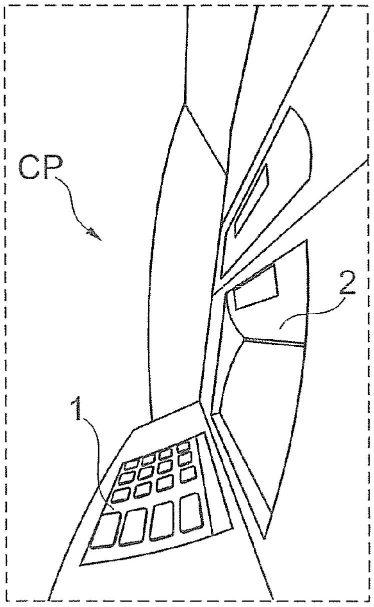
FIG. 5 reproduces the area covered by the camera from FIG. 4.
Figure 6:
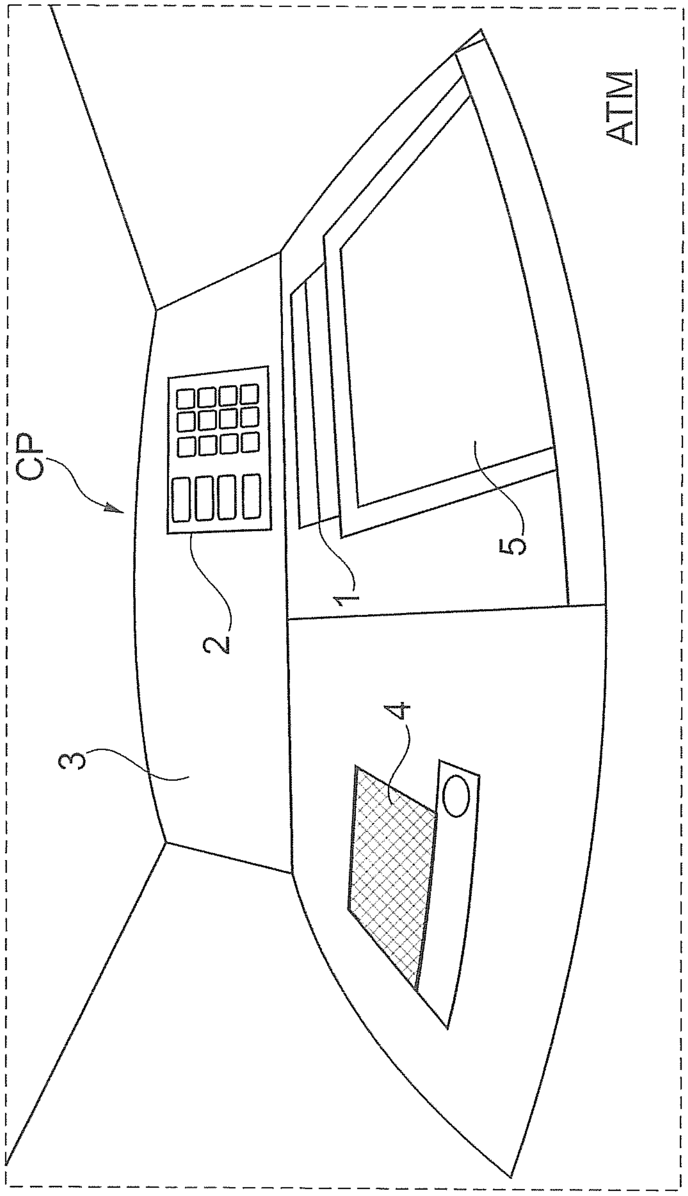
FIG. 6 reproduces the area covered by a camera providing images of the control panel from above.

FIG. 5 shows the coverage area of the camera CAM from the perspective of the camera. Said area includes in particular the cash-dispensing slot 1 and the keypad 2. The camera is equipped with a wide-angle lens to capture images of at least these two elements or partial areas of the control panel. The automated teller machine ATM is constructed in such a way that the surfaces of the elements named 1 and 2 are preferably as homogenous as possible with demarcating edges. Object recognition is thereby simplified. By mounting the camera CAM in this particularly suitable position, the partial areas, or elements, 1 and 2 can be measured optically with great reliability. Provision can be made for the camera to be focused sharply on particular areas. FIG. 6 illustrates an alternative position for the camera.

FIG. 6 demonstrates the field of coverage of a camera that resembles the camera CAM but is now installed in the upper area of the automated teller machine ATM and captures images of the control panel from above. In addition to the cash-dispensing slot 1 and the keypad 2, additional elements can be provided in the field of capture of the camera, for example an installation panel close to the keypad, a card slot 4, i.e. a guide for the card reader, and a screen or display. These additional elements mentioned 3, 4 and 5 also represent potential targets for manipulation attempts.

The camera has optics optimized for this application and a resolution of 2 megapixels and higher, for example. The camera CAM is connected to a special data processing unit 10 (see FIG. 7). This data processing unit, to be described later, makes it possible to evaluate the image data generated by the camera optimally in order to recognize immediately with great reliability a manipulation attempt, such as the installation of an overlay on the keypad 2 and to trigger alarms and deactivation as required. The following manipulations are among those that can be recognized reliably by means of the data processing unit:

- Installing a keypad overlay
- Installing a complete overlay at the lower installation panel
- Installing an overlay at the cash-dispensing slot (shutter) and/or installing objects to record security information, in particular PINs, such as mini-cameras, camera cell phones and similar spy cameras.

In order to recognize overlays, an optical measurement of the captured elements, such as of the keypad 2, is carried out inside the data processing unit 10 with the aid of the camera CAM in order to recognize discrepancies in the event of manipulation. Tests by the applicant have shown that reference discrepancies in the millimeter range can be clearly recognized. The invention is particularly suitable for recognizing foreign objects (overlays, spy camera, etc.) and it comprises edge detection that can be combined with segmentation as needed in order to recognize the contours of foreign objects in the control panel clearly and reliably. The image data processing required for this is carried out principally in the data processing unit described in what follows.

Figure 7:
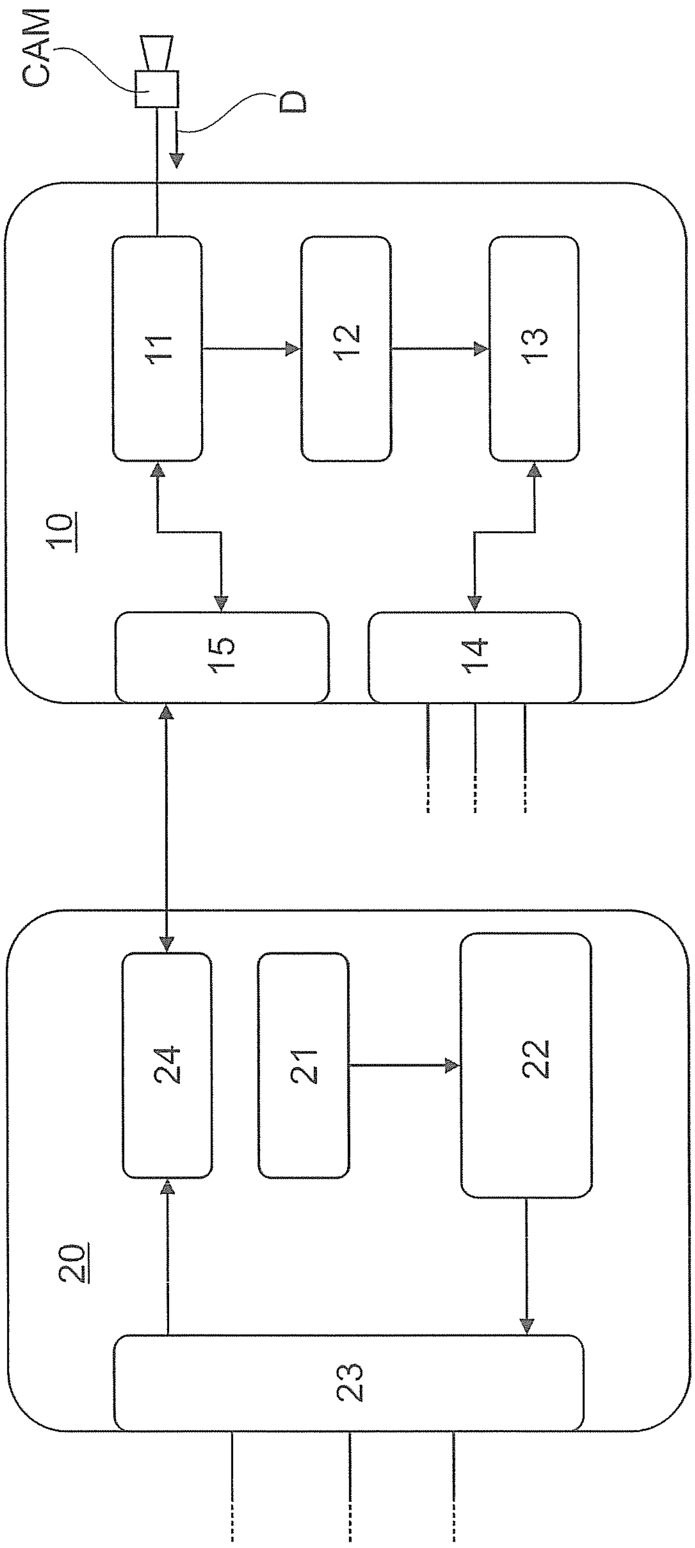
FIG. 7 shows a block diagram for a data processing unit connected to the camera and a video monitoring unit connected to said data processing unit.

FIG. 7 shows the block diagram of a data processing unit 10 in accordance with the invention to which the camera CAM is connected and a video monitoring, or CCTV, unit 20 that is connected to the data processing unit 10. The data processing unit 10 has in particular the following stages, or modules, that are to be understood here as logic blocks in which the previously mentioned sequences of steps in the method (refer to 110 to 130 in FIG. 1) are carried out.

In what follows and with reference to all Figures, but in particular to FIGS. 1, 2, 3 and 7, the structure and function of data processing and thus the procedure for the method are described in detail:

The sequence of steps 110 carries out a first stage 11 of data processing 10 to create at least one reference edge image REF (see also FIGS. 1 and 2*a*). To do this, an average image is calculated from several individual images in a first step 111. The individual images originate, for example, from a video stream that the camera CAM made following installation of the ATM before the actual commencement of operations, that is to say in a non-manipulated state. The calculation of an average image, wherein for example the average color value is calculated pixel by pixel, has the effect of suppressing noise in the image noise occurring in the individual images. In a next step 112, a gray-scale image is created from the colored average image. Then, in step 113, edge detection is performed by means of Sobel filtering (e.g. 3×3 horizontal, 3×3 vertical) to obtain a first reference edge image. For further optimization, in step 114 a segmentation filter is employed in which this first reference edge image is broken down into its black and white content by means of a threshold value. The result is a second reference edge image that in principle corresponds to a mask. This second image is preferably improved in an optional step 115 by manual image processing. In said step, distracting image elements in particular that are not significant for later evaluation are removed manually. Such elements are, for example, edges of an area not being monitored or virtual edges or artifacts that have arisen because of image noise and the like. The final result is a reference edge image REF as shown in FIG. 2*a*). This reference edge image REF reproduces the significant edges in the view of camera CAM (see also FIG. 5).

It should be remarked here once more that the edge images shown in FIGS. 2 and 3 should actually show white edge lines on a black background. In order to satisfy the requirements for patent drawings, said lines are reproduced here inverted, i.e. black edge lines are shown on a white background.

Now at least one edge image EM (see FIG. 2*b*) is created in a second stage 12 under actual conditions of use. Steps 121 to 124 are carried out that are designed similarly to steps 111 to 114. Accordingly, in step 121*a* colored average image is calculated from several individual images taken under real conditions. From this, a gray-scale image is created in a next step 122 that undergoes edge detection in step 123. Sobel filtering is applied here as well, wherein a segmentation filter is then employed in step 124. This segmented edge image EM is shown in FIG. 2*b*) (compare also with FIG. 5) and is brought in for the actual image evaluation.

In a third stage 13, this actual evaluation and recognition of manipulation attempts is carried out using the sequence of steps 130 (see FIG. 1). In a first step 131, the segmented edge image EM is linked logically to the reference edge image REF through an XOR operation. This produces a first results image R1 (see FIG. 2*c*) the distinguishing feature of which is that overlapping edges are hidden (compare with FIG. 2*a/b*). This first results image R1 is logically linked to the reference edge image REF in a further step 132 in an AND operation. This produces a second results screen R2 the distinguishing feature of which is that areas not to be monitored are hidden (compare with FIG. 2*a/b/c*). Accordingly, this second results screen R2 is essentially given only those edges that could be altered compared with the reference and could indicate a manipulation attempt.

FIG. 2*d*) shows a results image R2 that contains almost no more noticeable edges and thus does not display a manipulation attempt. FIG. 3*c*) shows this results image R2 again (edge image), and FIG. 3*a*) shows the corresponding original image, that is, the original camera image from the non-manipulated ATM (depiction of original camera image, not edge image).

In contrast, FIG. 3*d*) shows a results image R2*(edge image) that was also obtained by the data analysis described above (step sequence 130) and contains very noticeable edges that point to a manipulation attempt having been made. FIG. 3*b*) shows the corresponding original image, that is, the representation of the original camera image (not an edge image). The manipulation can be recognized in both images (FIG. 3*b/d*), namely that an overlay has been installed on the ATM.

Through the edge detection proposed here and the edge images generated, it is now easily possible to implement a fully automated recognition of manipulation attempts. To do this, step 133 is carried out (see FIG. 1) in which the results image R2 or R2* is examined for its white content. If a preset threshold value is exceeded, the high content indicates numerous manipulated edges. If this is the case, the system can trigger a protection function (automatic alarm, shutting down the ATM, etc.

To this end, stage 13 is in turn connected to an interface 14 over which the various alarm or monitoring devices can be activated or switched. Stages 11 and/or 12, which are used for image processing, can in turn be connected to a second interface 15 over which a connection is established to the CCTV unit 20. With the assistance of this CCTV unit, remote monitoring or remote diagnosis can be performed, for example.

As was described above, the data processing unit 10 is responsible for processing the image data D generated by the camera CAM. The image data D initially go to the first stage 11, or second stage 12, which generate edge images from the incoming image data, wherein, besides the actual edge detection, other steps can be carried out, such as shadow removal, vectorization and/or segmentation. Particularly in stage 12, feature extraction can be carried out as required that can be performed, for example, by means of blob analysis, edge positioning and/or color distribution. Blob analysis, for example, acts to recognize cohesive areas in an image and to take measurements on the blobs. A blob (binary large object) is an area of contiguous pixels having the same logical status. All pixels in an image belonging to a blob are in the foreground. All remaining pixels are in the background. In a binary image, pixels in the background have values corresponding to zero, while each pixel not equal to zero is part of a binary object.

Then, in stage 13 the actual evaluation takes place. A classification can also be provided which determines on the basis of the extracted features whether a hostile manipulation has occurred at the self-service terminal or automated teller machine ATM, or not.

The data processing unit 10 can, for example, be realized by means of a personal computer that is connected to the automated teller machine ATM or is integrated therein. In addition to the camera CAM already described that captures images of the partial areas of the control panel CP, an additional camera CAMO can be mounted at the automated teller machine ATM (see FIG. 4) that is directed at the user or customer and specifically captures an image of his face. This additional camera CAMO, also described as a portrait camera, can be triggered when a manipulation attack is recognized to record an image of the person at the automated teller machine. As soon as a skimming attack is recognized, the system described can, as an example, perform the following actions:

Store a photograph of the attacker, wherein both the camera CAN and the supplementary portrait camera CAMO can be activated Alarm the active automated teller machine applications and/or a central management server and/or a person, using e-mail as an example Initiate countermeasures, for example, disabling or shutting down the automated teller machine Transmit data, in particular images, of the recognized manipulation over the Internet via a central office.

The operator of the automated teller machine can configure the scope and type of actions or countermeasures taken over the system described here.

In place of a single camera installed directly at the control panel (see CAM in FIG. 4), several cameras can be installed there, wherein a first camera captures images of the control panel from the outside, a second camera captures images of the card slot from the inside, for example. In addition, a third camera corresponding to the portrait camera mentioned (see CAMO in FIG. 4) can be provided. For the actual manipulation recognition, the camera CAM at the control panel and, if necessary, a camera in the card slot (not shown here) can be used. The portrait camera CAMO is also used for the purpose of documenting a manipulation attempt.

All cameras preferably have a resolution of at least 2 megapixels. The lenses used have an acquisition angle of about 140 degrees and more. In addition, the exposure time of the cameras used is freely adjustable in a broad range from 0.25 msec, for example, up to 8000 msec (8 secs). As a result, exposure can be adjusted to the widest possible range of lighting conditions. Tests by the applicant have shown that a camera resolution of about 10 pixels per degree can be achieved. Referred to a distance of one meter, an accuracy of 1.5 mm per pixel can be achieved. This means in turn that manipulation above a reference discrepancy of 2 to 3 mm can be recognized with certainty. The closer the camera lens is to the captured element, or observed object, the more precise the measurement can be. Consequently, precision of less than 1 mm can be achieved closer up.

Depending on where the automated teller machine is used, i.e. in an outside area or inside, and the prevailing light conditions, it may be advantageous to mount the camera CAM in the side part of the housing of the automated teller machine ATM or in the upper area of the housing. Different possibilities for monitoring also result, depending on the camera position. Monitoring the different elements or partial areas achieves the following in particular:

Capturing images of the cash-dispensing slot (shutter) permits inspection of manipulations in the form of cash trappers, i.e. special overlays. Capturing images of the keypad field permits a determination of manipulation attempts there using overlays or changes to security lighting and the like. Capturing images of the installation panel makes it possible in particular to recognize complete overlays. Capturing images of the card slot 4, particularly through a camera integrated therein, makes it possible to recognize manipulations there.

It has been shown that discrepancies of 2 mm can be clearly recognized particularly at the keypad field and at the card slot. Discrepancies at the rear outer edge of the installation panel can be recognized starting at 4 mm. Discrepancies at the lower edge of the shutter can be recognized starting at 8 mm.

An optional system connection to the Internet over interface 23 (see FIG. 7) makes it possible to activate the camera, or the various cameras, by remote access. The image data acquired can also be transmitted over the Internet connection to a video server. In this way the respective camera functions almost as a virtual IP camera. The CCTV unit 20 described above serves in particular for such a video monitoring possibility, wherein the interface 15 to the CCTV unit is designed for the following functions:

Retrieving an image, adjusting the image rate, the color image, image resolution, triggering an event in the CCTV service when preparing a new image and/or possibly a visual enhancement of recognized manipulations on an image provided.

The system is designed such that in normal operation (e.g. withdrawing money, account status inquiry, etc.) no false alarms are caused by hands and/or objects in the image. For this reason, manipulation recognition is deactivated in the period of normal use of an automated teller machine. Time periods for cleaning or other brief uses (filing of bank statements, interactions before and after the start of a transaction) should not be used for manipulation recognition. Essentially it is preferable for only fixed and immobile manipulation attempts to be evaluated and recognized. The system is designed such that monitoring functions even under a wide variety of light conditions (day, night, rain, cloud, etc.). Similarly, briefly changing light conditions such as light reflections, passing shadows and the like are compensated for or ignored during image processing in order to avoid false alarms. In addition, technical events that occur such as a lighting failure and similar can be taken into account. These and other special cases are recognized and solved in particular by the third stage for classification.

The system presented here is also suitable for documenting recognized manipulations or for archiving such manipulations digitally. In the event of a recognized manipulation, the images recorded are stored with appropriate meta-information, such as time stamp, type of manipulation, etc. on a hard disc in the system or in a connected PC. For reporting purposes, messages can be passed on to a platform, such as error messages, status messages (deactivation, mode change), statistics, suspected manipulation and/or reports of alarms. In the event of an alarm, a suitable message containing the appropriate alarm level can be sent to the administration interface or the interface. The following possibilities can also be realized at this interface:

Retrieving camera data, such as number of cameras, state of construction, serial number, etc., master camera data or adjustment of camera parameters and/or registration for alarms (notifications).

The invention presented here is especially suitable for reliably recognizing hostile manipulations at a self-service terminal, as for example at an automated teller machine. To this end, the control panel is monitored continuously and automatically by at least one camera. By means of image data processing that includes edge detection, the elements captured by the camera are measured optically to recognize deviations from reference data. It has been shown that deviations in the range of millimeters can be recognized with certainty. For the recognition of foreign objects, a combination of edge detection and segmentation is preferably used so that contours of objects left behind can be clearly recognized and identified. In the event of a manipulation attempt, countermeasures or actions can be initiated.

The present invention was described using the example of an automated teller machine, but is not limited thereto, rather it can be applied to any type of self-service terminal.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method for recognizing manipulation attempts at a self-service terminal having a control panel with elements arranged therein that are provided for users of the self-service terminal, wherein a camera is directed towards at least one of the elements and wherein the image data generated by the camera are evaluated by a data processing unit, wherein at least one edge image is created by means of edge detection from the image data generated by the camera and in that the edge image is evaluated by means of a reference edge image, wherein at least one of the camera or the data processing unit is deactivated during operation of the self- service terminal, wherein to evaluate the at least one edge image, edge image data, which represent the edge image, are linked logically with reference edge image data, which represent the reference edge image, to form first results image data, which represent a first results image.

2. The method according to claim 1, wherein the first results image data, which represent the first results image, are logically linked to the reference edge image data, which represent the reference edge image, to form second results image data , which represent a second results image, specifically linked by an AND link.

3. The method according to claim 1, wherein in the second results image the white content is determined and wherein to recognize a manipulation attempt a check is made whether the white content exceeds a specified threshold value.

4. The method according to claim 1, wherein the edge image is calculated from several individual images, wherein an average image is calculated specifically by means of creating average values from the respective image data.

5. The method according to claim 1, wherein the reference edge image is calculated from several reference individual images, wherein in particular an average image is calculated by creating average values from the respective image data.

6. The method according to claim 4, wherein when creating the average values in each case the average color value for each pixel is established.

7. The method according to claim 4, wherein the respective average image is converted into a gray-scale image.

8. The method according to claim 1, wherein edge detection is performed by means of Sobel filtering image data, wherein the gray-scale image is exposed to Sobel filtering in order to create the edge image , or the reference edge image.

9. The method according to claim 1, wherein edge detection is carried out by means of segmentation filtering of image data, wherein the gray-scale image subjected to Sobel filtering undergoes segmentation filtering in order to create the edge image or the reference edge image.

10. The method according to claim 1, wherein the reference edge image undergoes manual image revision, wherein in particular the gray-scale image that underwent segmentation filtering undergoes manual image revision.

11. The method according to claim 1, wherein different reference edge images are created as a function of prevailing and/or emerging conditions, in particular of lighting and/or daylight conditions.

12. A data processing unit for recognizing manipulation attempts at a self-service terminal that has a control panel with elements arranged therein that are provided for users of the self-service terminal, wherein a camera is directed towards at least one of the elements and wherein the data processing unit evaluates the image data generated by the camera, characterized in that the device creates at least one edge image by means of edge detection from the image data generated, and in that the data processing unit evaluates the edge image using a reference edge image, wherein at least one of the camera or the data processing unit is deactivated during operation of the self-service terminal, wherein to evaluate the at least one edge image, edge image data, which represent the edge image, are linked logically with reference edge image data, which represent the reference edge image, to form first results image data, which represent a first results image.

13. A data processing unit according to claim 12, wherein the data processing unit is integrated into the self-service terminal.

14. A data processing unit according to claim 12, wherein the data processing unit has a first stage receiving the image data for image processing, in particular for shadow removal, edge detection, vectorization and/or segmentation.

15. A data processing unit from claim 14, wherein the data processing unit has a second stage downstream from the first stage for feature extraction, in particular by means of blob analysis, edge position and/or color distribution.

16. A data processing unit according to claim 15, wherein the data processing unit has a third stage downstream from the second stage for classification.

17. A data processing unit according to claim 12, wherein the data processing unit has interfaces for video monitoring systems and/or security systems.

18. A self-service terminal with a data processing unit for recognizing manipulation attempts, wherein the self-service terminal has a control panel with elements arranged therein that are provided for users of the self-service terminal, wherein a camera is directed towards at least one of the elements, and wherein the data processing unit evaluates the image data generated by the camera, characterized in that the data processing unit creates at least one edge image using edge detection from the image data generated, and in that the data processing unit evaluates the edge image using a reference edge image, wherein at least one of the camera or the data processing unit is deactivated during operation of the self-service terminal, wherein to evaluate the at least one edge image, edge image data, which represent the edge image, are linked logically with reference edge image data, which represent the reference edge image, to form first results image data, which represent a first results image.

19. The self-service terminal according to claim 18, wherein at least the elements captured by the camera represent elements suitable for manipulation and/or represent elements located in areas of the control panel suitable for manipulation.

20. The self-service terminal according to claim 18, wherein the elements provided in the control panel include a cash-dispensing slot, a keypad, an installation panel, a card slot and/or a monitor.

21. The self-service terminal according to claim 18, wherein the elements captured by the camera are controls that include specifically a cash-dispensing slot and a keypad.

22. The self-service terminal according to claim 18, wherein the camera is installed in the section of the housing of the self-service terminal that delimits the control panel to the side or upwards.

23. The self-service terminal according to claim 18, wherein the camera has a wide-angle lens with an acquisition angle of at least 130 degrees and/or has a resolution of at least 2 megapixels.

24. The self-service terminal according to claim 18, wherein at least the elements captured by the camera have optically clearly recognizable features, in particular edges demarcated from homogenous surfaces.

25. The self-service terminal according to claim 18, wherein the data processing unit , when it recognizes an attempt at manipulating the captured elements by processing the image data , triggers an alarm, disables the self-service terminal and/or activates an additional camera.

26. The self-service terminal according to claim 18, wherein the camera and/or the data processing unit monitors the dispensing of money at the cash-dispensing slot of the self-service terminal.

27. The method according to claim 1, further comprising deactivating the data processing unit when money is being withdrawn from the self-service terminal.

28. The data processing unit according to claim 12, wherein operation of the self-service terminal includes withdrawing money and checking account status.

29. The self-service terminal according to claim 18, wherein operation of the self-service terminal includes withdrawing money and checking account status.

30. The self-service terminal according to claim 19, wherein the camera captures images of one or more elements or parts thereof, the elements including at least one of a keypad, a card reader, a cash-dispensing slot, a card slot, a monitor, an installation panel, a logo, an information notice or a lettering.

31. The self-service terminal according to claim 20, wherein the elements are provided in or on the control panel of the self-service terminal.

32. The self-service terminal according to claim 21, wherein the elements are controls that are installed in partial areas of the control panel.

33. The self-service terminal according to claim 32, wherein the partial areas are areas partially captured by the camera.

34. A self-service terminal comprising:

a control panel with elements for use by users of the self-service terminal;

a camera directed to at least one of the elements; and a data processing unit configured to recognize manipulation attempts of the elements by evaluating image data of at least one of the elements generated by the camera, creating at least one edge image using edge detection from the generated image data, and evaluating the edge image using a reference edge image;

wherein at least one of the camera or the data processing unit is deactivated during operation of the self-service terminal to reduce false manipulation alarms due to presence of a user's hands or objects in the image data taken during user operation of the self-service terminal, wherein to evaluate the at least one edge image, edge image data, which re present the edge image, are linked logically with reference edge image data, which represent the reference edge image, to form first results image data, which represents a first results image.

35. The self-service terminal of claim 34, wherein the elements include a keypad, and the camera is directed towards the keypad.

36. The self-service terminal of claim 34, wherein the elements include at least one of a card reader, a cash-dispensing slot, or a card slot; and wherein the camera is directed towards the at least one card reader, cash-dispensing slot, or card slot.

37. The self-service terminal of claim 34, wherein the elements are on the control panel.

38. The self-service terminal of claim 34, wherein the elements are in the control panel.

39. The self-service terminal of claim 34, wherein at least one of the elements is in an area only partially captured by the camera.

* * * * *